Aug. 3, 1954     H. W. PETRIE     2,685,321
ANTISKID CHAIN MEANS FOR WHEELS

Filed Sept. 8, 1952     2 Sheets-Sheet 1

INVENTOR.
Harold W. Petrie.
BY
ATTORNEY.

Aug. 3, 1954                H. W. PETRIE                2,685,321
                    ANTISKID CHAIN MEANS FOR WHEELS
Filed Sept. 8, 1952                                  2 Sheets-Sheet 2
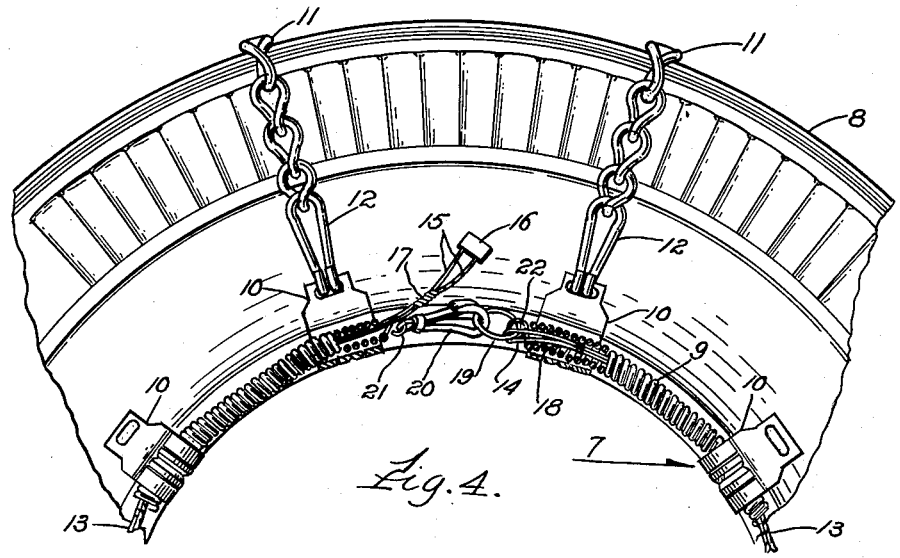
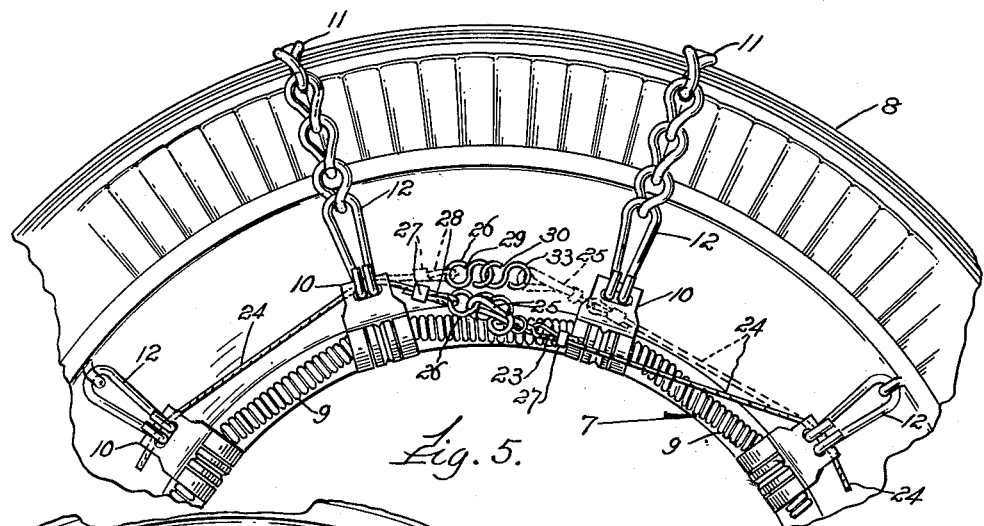
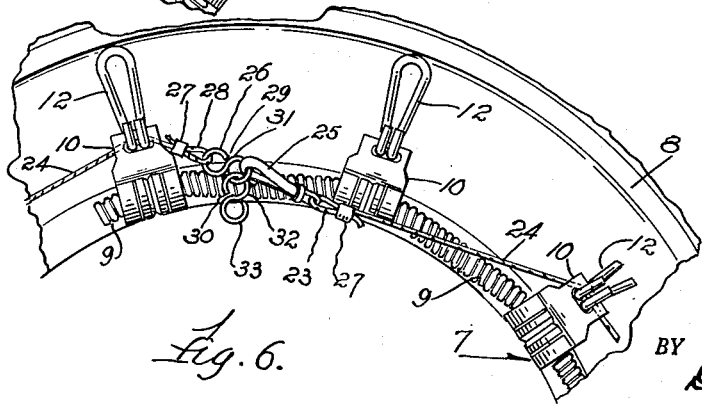
INVENTOR.
Harold W. Petrie
BY
ATTORNEY.

Patented Aug. 3, 1954

2,685,321

UNITED STATES PATENT OFFICE 2,685,321

ANTISKID CHAIN MEANS FOR WHEELS

Harold W. Petrie, Lemont, Ill.

Application September 8, 1952, Serial No. 308,373

6 Claims. (Cl. 152—219)

My invention relates to anti-skid chains for vehicle wheels to insure traction on slippery pavements. This invention is an improvement over the invention disclosed in my co-pending patent application designated Serial No. 272,848 filed February 21, 1952, now Patent No. 2,673,586.

An important object of my invention is to provide anti-skid chain means of the aforementioned character which is adjustable to take the various sizes of tires from the 600 size to the 750 size.

Another object of my invention is to provide limiting expansion means of the spring means, incorporated in the structure of my anti-skid chain means construction, so as to limit the expansion of the said spring means when the vehicle is subjected to speedy rotation in actual operation, yet without disturbing its clinging attributes to the peripheral portion of the vehicle wheel tire.

A further object of my invention is to provide, in a device of the aforementioned character, continuous, or endless, spring means on one side thereof, and open spring means on the opposite side thereof which is attachable by means of snap locking means.

A further object of my invention is to provide, in a device of the aforementioned character, resilient means which will at all times assure close fit of the anti-skid chain means with respect to the peripheral section of a tire on a vehicle wheel.

A still further object of my invention is to limit the expansion of the spring means utilized, in order to limit their expansion when the same are subjected to centrifugal action by the speedy rotation of the vehicle wheel.

A still further object of my invention is to provide a device of the aforementioned character which is readily mountable upon, and demountable from, a vehicle tire; the same being of a practical construction for the purposes for which it is purported to be used, and of such elemental construction as to warrant economical production thereof in quantity manufacture.

Other objects and ancillary advantages inherent in my invention will become apparent from an examination of the accompanying drawings, bearing further expository elucidation in the ensuing description, wherein the respective elements thereof are designated by like numerals throughout all the figures, and in which;

Fig. 4 is an enlarged fragmentary portion of the device as illustrated in Fig. 3 showing the cable means utilized to limit the expansion of the spring means when subjected to rotation thus limiting the centrifugal expansion thereof.

Fig. 5 is an enlarged fragmentary view, partly in section and as illustrated in Fig. 3, showing the means utilized for adjustability of the chain means, so as to make it compatible with, as well as to enable it to accommodate, the different sizes of tires, namely, from 600 to 750.

Fig. 6 is a view similar to Fig. 5 indicating another adjustment.

Figure 2:
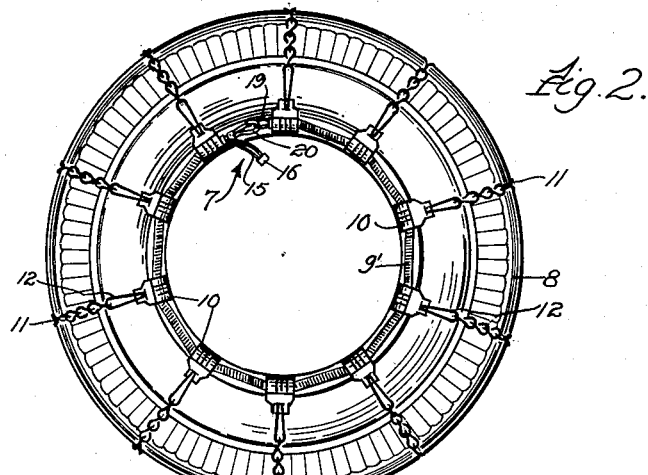
Fig. 2 is a top view of Fig. 1 showing the inner side.
Figure 1:
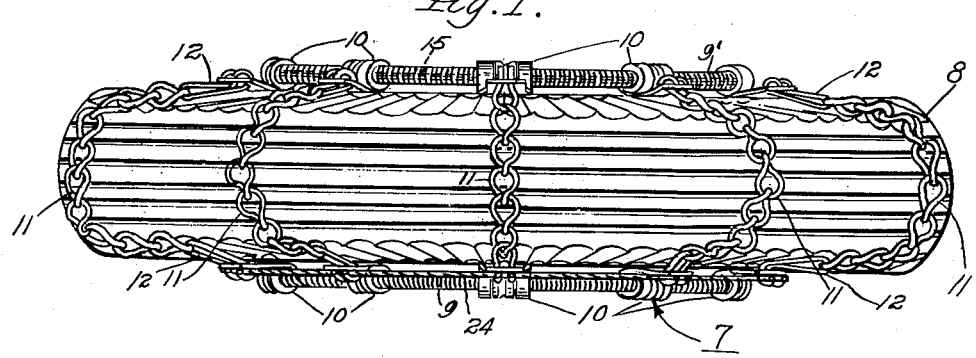
Fig. 1 is a top view of a vehicle wheel showing my invention mounted thereupon.
Figure 3:
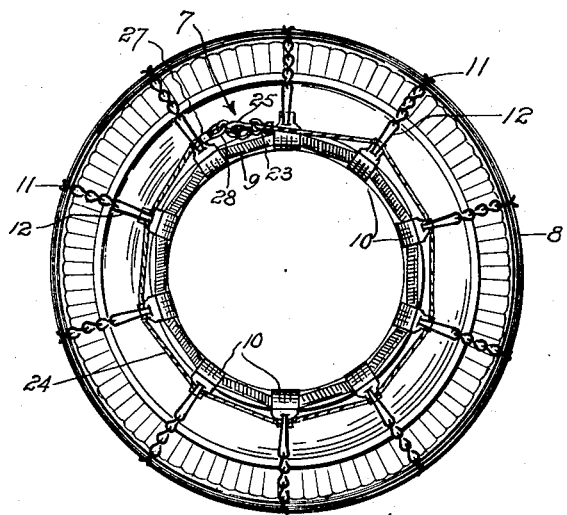
Fig. 3 is a bottom view of Fig. 1 showing the outer side.

Referring to the various views, my invention is, generally, designated 7, and it is shown mounted on a vehicle tire 8 having the spring elements 9 and 9' the spring element 9' being endless, the attaching clips 10, the connecting links 12, and the cross chain elements 11; details of the said structures are expounded in my co-pending patent application designated hereinabove.

The elemental construction of the centrifugal expansion limiting means consists of a cable 13 which is doubled over in order to form the attaching loop 14 which is secured to a ring element 19 engageable releasably by the snap-lock 20 which is rigidly secured to the terminal portion 21 of the open ended spring 9; the ring element 19 being secured to the other terminal portion 22 of the said spring 9. The core opening 18 within the spring element 9 furnishes a housing for the cable 13 which has its termini 15 twisted about as indicated at 17 to insure rigidity and prevent unraveling thereof; ultimately the terminal portions 15 being secured to the stop element 16 which will limit the movement of the centrifugal expansion of the spring 9 when the wheel is subjected to speedy rotation.

The snap-locking ring means 19 and the snap-locking means 20 facilitate mounting and dismounting the anti-skid means on a tire 8. Since the spring element 9 is completely closed or endless, it is draped over the outer side of the wheel 8, whereas the snap locking means 20 is caused to engage the ring 19 on the opposite or inner side of the wheel. Thus the tire is hugged closely by the cross-chains 11 and prevents whipping of the said chains loosely thereupon, which is the cause of reducing traction in anti-skid chains of conventional manufacture, and militates against proper operation, inasmuch as the cross-chains 11 are subjected to greater wear and cause considerable noise in operation. As a result of my invention hugging closely the peripheral portions of the wheel 8, the same is practically noiseless and will last a considerably longer time.

In order to accommodate the anti-skid chain means so that it may encompass larger or smaller tires on the side where the endless spring element 9' is mounted, a cable 24 is trained over the clip elements 10 so that its end is secured by means of a ferrule 27 to form an attaching loop 23 to be secured to a snap-locking means 25 similar to the one indicated at 20, and engaging a link portion 26 of the link 29 secured to a loop portion 28 held in place by a ferrule 27. To the loop 28 are secured adjustable linkage of Figure 8 configuration designated 29 and 30 and having circular link portions 26, 31, 32, and 33. In Fig. 5 the cable 24 is adjusted so that the anti-skid chain means is at its smallest diametral adjustment to span the smallest size tire, wherein it will be noted that the snap-locking means 25 is secured to the link portion 26. In dotted lines, the maximum adjustment is shown, wherein the snap-locking means 25 is secured to the link portion 33.

In Fig. 6 an intermediate adjustment is indicated showing that the snap-locking means 25 is secured to a link portion 31, and for a slightly larger dimension the snap-locking means 25 could be secured to the link portion 32. Thus the anti-skid chain means may be removably attachable quickly and readily to tires of different sizes; the Figure 8 linkage means 29 and 30 affording a range of adjustment to accommodate the various sizes of tires indicated hereinbefore.

Thus, in attaching the anti-skid chain means, once the size of the tire 8 is determined, the snap-locking means 25 will be secured to the proper link portion 26, 31, 32 or 33, and that will remain permanently as an adjustment. The other side, which affords convenience and facility for attaching and removal of the anti-skid chain means, will have the ring 19 attachable removably to the snap-locking means 20 for securing the anti-skid chain device means onto the tire 8 or for removal by disconnecting the ring means 19 from the snap-locking means 20.

The cable means 13 will function to limit the expansibility of the centrifugal action of the spring means 9 and 9' in its maximum capacity by causing the stop means 16 to contact the terminal portion of the spring 9, and for the smaller adjustments of the anti-skid chain means, the cable means 13 may be twisted or so bent as to afford an intermediate stop to abut the terminal portion of the spring 9 so that reliance on the stop means 16 will not have to be resorted to for all adjustments.

The anti-skid chain means improvement disclosed in the foregoing description, and illustrated in the accompanying drawing, is believed to be of very simple construction and I wish to stress that it will, at all times, fit snugly a tire 8 and tires of different sizes, so that the whipping action to which the cross chains 11 may be subjected when the wheel is in operation or rotation, will not produce slap or whip, will be practically noiseless, and will minimize wear to the greatest extent.

Having thus described and revealed my invention, what I claim as new and desire to secure by Letters Patent is:

1. In resiliently responsive anti-skid chain means equipped with circularly arranged hollow coil spring means including one endless spring element, and one spring element having an open portion; releasable attaching means, comprising ring means secured to one terminal portion of the said last-mentioned spring element, snap locking means secured to the other terminal portion of the said last-mentioned spring element and adapted to engage releasably the said ring means, and centrifugal expansion limiting means, including cable means provided with loop means secured to the said ring means and trained to operate within the said last-mentioned spring element its termini extending therebeyond, and limiting stop means secured to the said termini of the said cable means and engageable with said last-mentioned spring element.

2. In resiliently responsive anti-skid chain means equipped with circularly arranged hollow coil spring means including one endless spring element, and one spring element having an open portion; releasable attaching means, comprising ring means secured to one terminal portion of the said last-mentioned spring element, snap locking means secured to the other terminal portion of the said last-mentioned spring element and adapted to engage releasably the said ring means, centrifugal expansion limiting means, including cable means provided with loop means secured to the said ring means and trained to operate within the said last-mentioned spring element its termini extending therebeyond, and limiting stop means secured to the said termini of the said cable means and engageable with said last-mentioned spring element, and adjustable means to limit the expansion of the said endless spring element comprising cable means secured to said chain means and located substantially concentrically with respect to the said endless spring element, a multiplicity of link means secured to one terminal portion of the said last-mentioned cable means, and snap locking means secured to the other terminal portion of the said last-mentioned cable means.

3. In resiliently responsive anti-skid chain means equipped with circularly arranged hollow coil spring means including one endless spring element, and one spring element having an open portion; releasable attaching means, comprising ring means secured to one terminal portion of the said last-mentioned spring element, snap locking means secured to the other terminal portion of the said last-mentioned spring element and adapted to engage releasably the said ring means, centrifugal expansion limiting means, including cable means provided with loop means secured to the said ring means and trained to operate within the said last-mentioned spring element its termini extending therebeyond, and limiting stop means secured to the said termini of the said cable means and engageable with said last-mentioned spring element, and adjustable means to limit the expansion of the said endless spring element comprising cable means secured to said chain means and located substantially concentrically with respect to the said endless spring element, a multiplicity of link means of figure eight configuration secured to one terminal portion of the said last-mentioned cable means, and snap locking means secured to the other terminal portion of the said last-mentioned cable means.

4. In resiliently responsive anti-skid chain means equipped with circularly arranged hollow coil spring means including one endless spring element, and one spring element having an open portion; releasable attaching means, comprising ring means secured to one terminal portion of the said last-mentioned spring element, snap locking means secured to the other terminal portion of the said last-mentioned spring element and adapted to engage releasably the said ring means, centrifugal expansion limiting means, including cable means provided with loop means secured to the said ring means and trained to operate within the said last-mentioned spring element its termini extending therebeyond, and limiting stop means secured to the said termini of the said cable means and engageable with said last-mentioned spring element, and adjustable means to limit the expansion of the said endless spring element comprising cable means secured to said chain means and located substantially concentrically with respect to the said endless spring element, a multiplicity of link means secured to one terminal portion of the said last-mentioned cable means, and snap locking means secured to the other terminal portion of the said last-mentioned cable means, the said last-mentioned snap locking means being adapted to engage varied link portions of the said link means to afford increase and decrease in the circumferential magnitude of the said anti-skid chain means.

5. In resiliently responsive anti-skid chain means equipped with circularly arranged hollow coil spring means including one endless spring element, and one spring element having an open portion; releasable attaching means, comprising ring means secured to one terminal portion of the said last-mentioned spring element, snap locking means secured to the other terminal portion of the said last-mentioned spring element and adapted to engage releasably the said ring means, and adjustable means to limit the expansion of the said endless spring element comprising cable means secured to said chain means and located substantially concentrically with respect to the said endless spring element, a multiplicity of link means of figure eight configuration secured to one terminal portion of the said last-mentioned cable means, and snap locking means secured to the other terminal portion of the said last-mentioned cable means, the said last-mentioned snap locking means being adapted to engage varied link portions of the said link means to afford increase and decrease in the circumferential magnitude of the said anti-skid chain means.

6. In resiliently responsive anti-skid chain means equipped with circularly arranged hollow coil spring means including one endless spring element, and one spring element having an open portion; releasable attaching means, comprising ring means secured to one terminal portion of the said last-mentioned spring element, snap locking means secured to the other terminal portion of the said last-mentioned spring element and adapted to engage releasably the said ring means, centrifugal expansion limiting means, including cable means provided with loop means secured to the said ring means and trained to operate within the said last-mentioned spring element its termini extending therebeyond, and limiting stop means secured to the said termini of the said cable means and engageable with said last-mentioned spring element, and adjustable means to limit the expansion of the said endless spring element comprising cable means secured to said chain means and located substantially concentrically with respect to the said endless spring element, a multiplicity of link means of figure eight configuration secured to one terminal portion of the said last mentioned cable means, and snap locking means secured to the other terminal portion of the said last-mentioned cable means, the said last-mentioned snap locking means being adapted to engage varied link portions of the said link means to afford increase and decrease in the circumferential magnitude of the said anti-skid chain means.

References Cited in the file of this patent

UNITED STATES PATENTS

| Number | Name | Date |
|---|---|---|
| 1,213,949 | Reger | Jan. 30, 1917 |
| 1,400,896 | Mestars | Dec. 20, 1921 |
| 1,424,347 | Evans | Aug. 1, 1922 |
| 1,466,270 | Campbell et al. | Aug. 28, 1923 |
| 1,578,803 | Comey | Mar. 30, 1926 |
| 1,901,311 | Lloyd | Mar. 14, 1933 |
| 2,192,227 | Hill | Mar. 5, 1940 |
| 2,324,463 | Brady | July 20, 1943 |
| 2,575,966 | Mank | Nov. 20, 1951 |